UNITED STATES PATENT OFFICE.

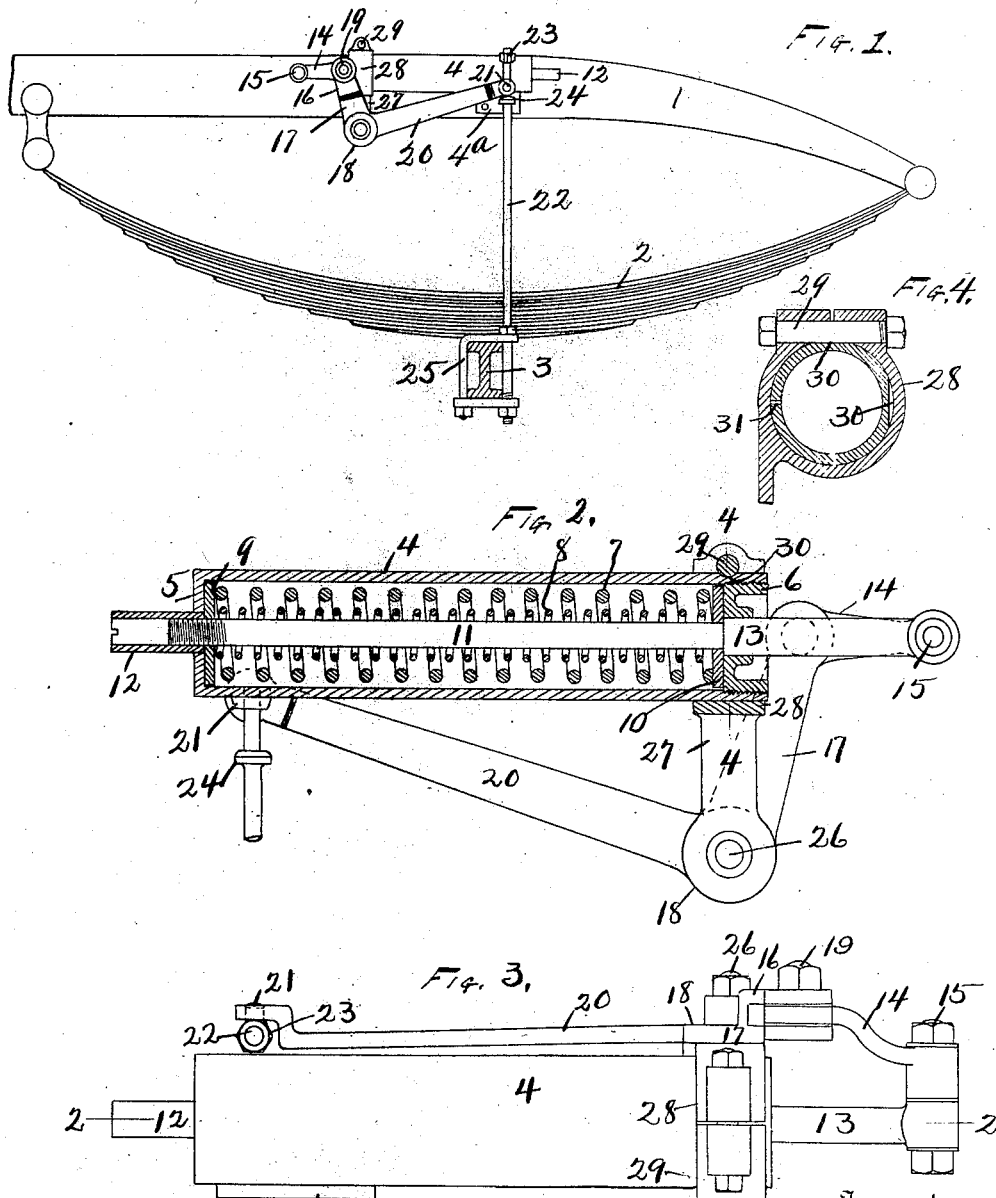

CHARLES SWAN, OF CORRY, PENNSYLVANIA.

SHOCK-ABSORBER.

963,094.  Specification of Letters Patent.  Patented July 5, 1910.

Application filed January 22, 1909. Serial No. 473,673.

*To all whom it may concern:*

Be it known that I, CHARLES SWAN, a citizen of the United States, residing at Corry, in the county of Erie and State of Pennsylvania, have invented new and useful Improvements in Shock-Absorbers, of which the following is a specification.

This invention relates to shock absorbers and consists in certain improvements in the construction thereof as will be hereinafter fully described and pointed out in the claim.

It is thought desirable in such vehicles as automobiles, that the ordinary springs be allowed full play under normal conditions, and that the shock absorbers only act with an excess of movement of the springs, or in other words when an excess shock takes place.

One of the objects of the invention is to provide a shock absorber that will act in this way.

Other objects of the invention will appear from the specification and claim.

The invention is illustrated in the accompanying drawings as follows:

Figure 1 shows a side elevation of a fragment of the vehicle frame, spring and axle, the axle being in section, and the shock absorber in place. Fig. 2 is a section on the line 2—2 in Fig. 3. Fig. 3 is a plan view of the device. Fig. 4 is a section on the line 4—4 in Fig. 2.

1 marks the sill of the vehicle; 2 the spring and 3 the axle. A cylinder 4 is secured to the sill in any desired manner, a lug or bracket 4ª being provided for this purpose. One end of this cylinder has the inwardly extending flange 5, and the opposite end is screw threaded and provided with a nut 6. A spring 7 is arranged in the cylinder, and is under normal tension when the nut 6 is in place. A spring 8 is preferably nested within the spring 7. A washer 9 is arranged against the flange 5 and a washer 10 against the nut 6. These washers form bases for the springs. A rod 11 extends through the cylinder and springs. It is provided with a sleeve 12 at one end, forming a shoulder on the rod, and an extension 13 also forms a shoulder on the rod. The distance between these shoulders can be adjusted by means of the screw thread on the end of the rod operating in the sleeve 12.

It will be observed that if the rod is forcibly moved in either direction it will compress the spring. Thus if the rod is moved toward the right the shoulder 12 will engage the washer 9, and will carry with it the washer 9 and thus compress the spring. While on the other hand if moved toward the left the shoulder formed by the extension 13 will engage the washer 10, and carry the washer 10 with it, thus compressing the springs.

The extension 13 is connected with a link 14 by means of the bolt 15. The link extends into the throat 16 of the arm 17 of a bell crank lever 18. The link is secured in the throat by the bolt 19. The opposite arm 20 of the bell crank lever is provided with the eye bolt 21. A rod 22 extends through this eye bolt. It is provided with the shoulders 23 and 24 so distanced as to permit of a normal play of the spring 2 without engaging the eye bolt. The rod 22 is secured to the axle by any convenient clamp. As shown it is secured by the clamp 25 in which the rod forms a part.

In operation when the vehicle is subjected to severe shock one of the shoulders 23 or 24 engages the eye bolt and operating on the bell crank lever moves the rod 11 either in one direction or the other depending on the direction of the shock, thus compressing the spring and absorbing the shock. The distance between the shoulders 23 and 24 is such, that the normal operation of the spring 2 is not interfered with. As shown in Fig. 1, the spring 2 is compressed, and the shoulder 24 is in engagement with the bell crank lever, while in Fig. 2 the springs are in normal position.

It is some times desirable to secure the cylinder with the lug or bracket 4ª extending under the sill or over the sill as distinguished from being secured at the side as shown in the drawings. I therefore make the bracket 27 on which the bell crank lever is mounted adjustable. The bracket is carried by a split ring 28. A bolt 29 extends through the ring, so that it can be securely clamped on the cylinder 4. The cylinder 4 is provided with the key ways 30 into which the bolt 29 extends, so as to assist the clamping action in locking the bracket in place. These key ways 30 are arranged at different points on the cylinder, so as to permit of different attachments to the cylinder with relation to the bracket, so that the cylinder may be secured to different parts of the sill. I also prefer to split the end of the cylinder 4 as at 31, so that the clamping of the ring 28 locks the nut 6 in adjustment.

What I claim as new is:

In a shock absorber, the combination of a cylinder; means for attachment to an axle and a vehicle body, one of said means being in the form of a bracket on said cylinder; a second bracket on the cylinder, one of said brackets on the cylinder being adjustable; supports at each end of the cylinder for receiving the end thrust of the spring; a bell crank lever secured to the second of said brackets on the cylinder; a rod extending through the spring; devices on the rod for engaging each end of the spring; a connection between the rod and the bell crank lever; and a connection between the bell crank lever and the other of said means comprising a rod having shoulders thereon and slidingly connected with the bell crank lever, said shoulders being spaced to engage the bell crank lever only with an excess of relative movement between said means.

In testimony whereof I have hereunto set my hand in the presence of two subscribing witnesses.

CHARLES SWAN.

Witnesses:
ROBT. J. OSBORNE,
CLARA PETTENGILL.